US006771216B2

(12) United States Patent
Patel et al.

(10) Patent No.: US 6,771,216 B2
(45) Date of Patent: Aug. 3, 2004

(54) NEARFIELD CALIBRATION METHOD USED FOR PHASED ARRAY ANTENNAS CONTAINING TUNABLE PHASE SHIFTERS

(75) Inventors: Jaynesh Patel, Columbia, MD (US); Cornelis Fredrick du Toit, Ellicott City, MD (US); Vincent G. Karasack, Ellicott City, MD (US)

(73) Assignee: Paratex Microwave Inc., Columbia, MD (US)

( * ) Notice: Subject to any disclaimer, the term of this patent is extended or adjusted under 35 U.S.C. 154(b) by 73 days.

(21) Appl. No.: 10/223,709

(22) Filed: Aug. 19, 2002

(65) Prior Publication Data

US 2003/0038747 A1 Feb. 27, 2003

Related U.S. Application Data

(60) Provisional application No. 60/314,368, filed on Aug. 23, 2001.

(51) Int. Cl.[7] ............................ H01Q 3/26; H01Q 3/00; G01S 7/40

(52) U.S. Cl. ........................ 342/368; 342/174; 342/377

(58) Field of Search ................................ 342/174, 368, 342/372, 377

(56) References Cited

U.S. PATENT DOCUMENTS

| | | | | |
|---|---|---|---|---|
| 5,294,934 A | | 3/1994 | Matsumoto | 342/173 |
| 5,477,229 A | * | 12/1995 | Caille et al. | 342/174 |
| 5,861,843 A | | 1/1999 | Sorace et al. | 342/372 |
| 5,929,809 A | | 7/1999 | Erlick et al. | 342/372 |
| 6,084,545 A | | 7/2000 | Lier et al. | 342/360 |
| 6,157,343 A | | 12/2000 | Andersson et al. | 342/371 |
| 6,208,287 B1 | | 3/2001 | Sikina et al. | 342/174 |
| 6,236,839 B1 | | 5/2001 | Gu et al. | 455/67.4 |
| 6,507,315 B2 | * | 1/2003 | Purdy et al. | 342/374 |
| 6,538,603 B1 | * | 3/2003 | Chen et al. | 342/372 |
| 2003/0038746 A1 | * | 2/2003 | Patel et al. | 342/368 |

FOREIGN PATENT DOCUMENTS

| | | |
|---|---|---|
| GB | 2 171 849 A | 9/1986 |
| GB | 2 267 603 A | 12/1993 |
| JP | 03165103 | 7/1991 |
| WO | WO 00/67343 A1 | 11/2000 |

OTHER PUBLICATIONS

PCT International Search Report for International Application No. PCT/US02/28383 dated Dec. 9, 2002.

Tanaka M. et al. "On–Orbit Measurement of Phased Arrays in Satellites by Rotating Element Electric Field Vector Method" Electronics & Communications in Japan, Part I vol. 81, No. 1, 13 pages, 1998.

Rahmat–Samii Y. et al. "Application of Spherical Near–Field Measurements to Microwave Holographic Diagnosis of Antennas", IEEE Transactions on Antennas and Propagation, vol. 36, No. 6, pp. 869–878, Jun. 1988.

* cited by examiner

*Primary Examiner*—Gregory C. Issing
*Assistant Examiner*—F. H. Mull
(74) *Attorney, Agent, or Firm*—Robert P. Lenart; James S. Finn

(57) ABSTRACT

A method for calibrating a phased array antenna and the calibrated phased array antenna are described herein. In the preferred embodiment of the present invention, the method for calibrating a phased array antenna containing a plurality of electronically tunable phase shifters each of which is coupled to a column of radiating elements includes the steps of: (a) characterizing each of the electronically tunable phase shifters; (b) calculating phase offsets for each column of radiating elements using a nearfield antenna range and the characterized data for each of the electronically tunable phase shifters; and (c) using the calculated phase offsets in a calibration table to adjust the tuning voltage of each of the electronically tunable phase shifters to cause the columns of radiating elements to yield a uniform beam.

28 Claims, 3 Drawing Sheets

NEARFIELD CALIBRATION METHOD USED FOR PHASED ARRAY ANTENNAS CONTAINING TUNABLE PHASE SHIFTERS

CLAIMING BENEFIT OF PRIOR FILED PROVISIONAL APPLICATION

This application claims the benefit of U.S. Provisional Application Ser. No. 60/314,368 filed on Aug. 23, 2001 and entitled “Calibration Method Used For Electronically Scanning Antennas Containing Tunable Phase Shifters Utilizing a Near-Field Antenna Range” which is incorporated by reference herein.

BACKGROUND OF THE INVENTION

1. Field of the Invention

This invention relates to antennas, and more particularly to a method for calibrating a phased array antenna and a calibrated phased array antenna.

2. Description of Related Art

Microwave terrestrial and satellite communications systems are rapidly being deployed to serve communications needs. In these systems, to ensure a radio communication link between a fixed station on the ground or on a satellite and a mobile station such as an automobile or airplane, antenna systems with scanning beams have been put into practical use. A scanning beam antenna is one that can change its beam direction, usually for the purpose of maintaining a radio link, e.g. to a tower or satellite, as a mobile terminal is moving and changing direction. Another application of a scanning beam antenna is in a point-to-multipoint terrestrial link where the beams of a hub antenna or remote antenna must be pointed in different directions on a dynamic basis.

Early scanning beam antennas were mechanically controlled. The mechanical control of scanning beam antennas have a number of disadvantages including a limited beam scanning speed as well as a limited lifetime, reliability and maintainability of the mechanical components such as motors and gears.

Electronically controlled scanning beam antennas are becoming more important with the need for higher speed data, voice and video communications through geosynchronous earth orbit (GEO), medium earth orbit (MEO) and low earth orbit (LEO) satellite communication systems and point-to-point and point-to-multipoint microwave terrestrial communication systems. Additionally, new applications such as automobile radar for collision avoidance can make use of antennas with electronically controlled beam directions.

Phased array antennas are well known to provide such electronically scanned beams and could be an attractive alternative to mechanically tracking antennas because they have the features of high beam scanning (tracking) speed and low physical profile. Furthermore, phased array antennas can provide multiple beams so that multiple signals of interest can be tracked simultaneously, with no antenna movement.

In typical embodiments, phased array antennas incorporate electronic phase shifters that provide a differential delay or a phase shift to adjacent radiating elements to tilt the radiated phase front and thereby produce farfield beams in different directions depending on the differential phase shifts applied to the individual elements or, in some cases, groups of elements (sub-arrays). Of course, there is a need to efficiently and effectively calibrate the phased array antennas and, in particular, there is a need to efficiently and effectively calibrate phased array antennas that incorporate voltage tunable dielectric phase shifters. These needs and other needs are satisfied by the method for calibrating a phased array antenna and a calibrated phased array antenna of the present invention.

BRIEF DESCRIPTION OF THE INVENTION

The present invention includes a method for calibrating a phased array antenna and a calibrated phased array antenna. In the preferred embodiment of the present invention, the method for calibrating a phased array antenna containing voltage tunable dielectric phase shifters and a controller for supplying control voltage to the phase shifters includes the steps of: (a) applying zero voltage to each of the phase shifters and measuring the phase of each of a plurality of columns of radiating elements in the phased array antenna; (b) using the measured phase to determine a phase target value for each of the plurality of columns of radiating elements in the phased array antenna; (c) adjusting a phase shift for each column of the radiating elements in the phased array antenna to a value within a predetermined range of the phase target value to generate phase offset data; and (d) using the phase offset data in a calibration table used by the controller to adjust the tuning voltage of each of the phase shifters to cause the columns of radiating elements to yield a uniform beam.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
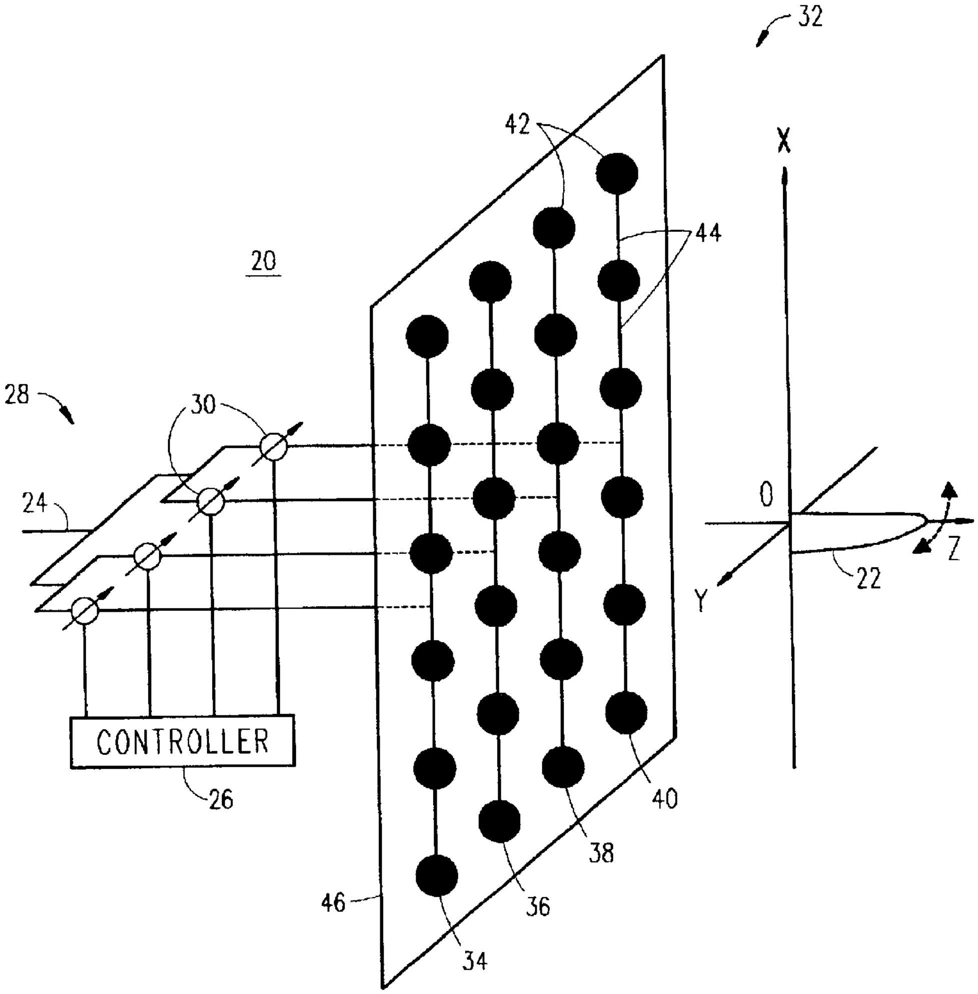
FIG. 1 is a schematic representation of a one-dimensional scan phased array antenna that can be calibrated in accordance with the method of the present invention.

Referring to the drawings, FIG. 1 is a schematic representation of an one-dimensional scan phased array antenna 20 that can be calibrated in accordance with the present invention. The antenna 200 scans a radiating beam 22 in a horizontal direction by electronically changing the phase of the electromagnetic energy supplied to the individual sub-arrays of radiating elements 34, 36, 38 and 40.

The one-dimensional scan phased array antenna 20 of FIG. 1 includes an RF signal input port 24, a controller 26 that can be a computer, a feeding system 28, a phase control means including a plurality of phase shifters 30 (four shown), and a radiating element array 32. The radiating element array 32 includes a plurality of sub-arrays 34, 36, 38 and 40. Each sub-array 34, 36, 38 and 40 includes a plurality of radiating elements 42 that are arranged in a column, connected by feed lines 44, and mounted on a grounded low loss dielectric substrate 46.

For each sub-array 34, 36, 38 and 40 in the radiating element array 32, the phase can be controlled to get a desired radiation beam 22 in the plane normal to the sub-array, i.e.

the y-z plane. In FIG. 1 the radiation beam 22 is changeable in y-z plane. The radiation beam 22 can change its beam direction electronically in the y-z plane with a fixed designed pattern in the x-z plane, for example, cosecant-square and pencil beam patterns.

The number of sub-arrays 34, 36, 38 and 40 in radiation element array 32 is the same as the number of phase shifters 30. The distance between two adjacent sub-arrays 34, 36, 38 and 40 should be in the range of 0.5 to 1 of the working wavelength of the signals to be transmitted and/or received by the antenna 20 for the purpose of getting high gain without grating lobes. To achieve the desired spacing of the radiating elements 42, the phase shifters 30 are not located in the plane occupied by the radiating elements 42. Every input port of the sub-array 34, 36, 38 and 40 in radiating element array 32 should have a good RF impedance match with every phase shifter 30 through RF lines, such as micro strip lines, cables, strip lines, fin-lines, co-planar lines, waveguide lines, etc.

By electronically adjusting the phase and amplitude of the signal that is fed to every sub-array 34, 36, 38 and 40, a tunable radiation pattern 22 can be obtained in the y-z plane (horizontal) like the one shown in FIG. 1.

The one-dimensional scan phased array antenna 20 that is described above has a radiation pattern 22 with a fixed beam shape and width in one plane (for example, the vertical plane) and scanning radiation beam in another plane (for example, the horizontal plane). This one-dimensional scan phased array antenna 20 can be used in microwave terrestrial wireless communication systems and satellite communications systems. The antenna 20 of FIG. 1 is more fully described in commonly owned co-pending application Ser. No. 09/621,183, which is hereby incorporated by reference.

Figure 2:
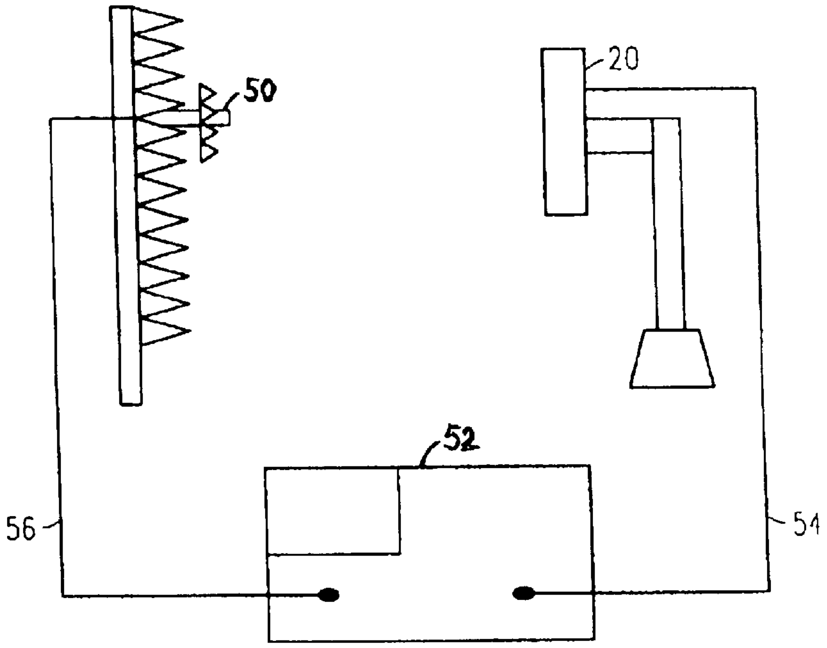
FIG. 2 is a block diagram of the components used in a system that uses the calibration method of the present invention.

FIG. 2 is a block diagram of the components used in a system that uses the calibration method of the present invention. An antenna 20 is positioned in a nearfield test range and aligned toward a nearfield scanner probe 50. A network analyzer 52 supplies signals to the antenna 20 via cable 54 and receives signals from the scanner probe 50 via cable 56.

Figure 3:
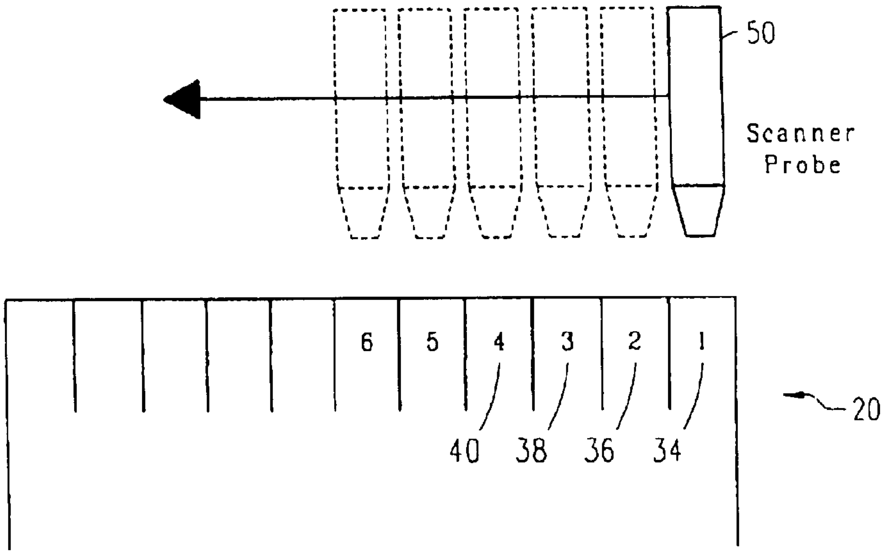
FIG. 3 is a schematic diagram showing the movement of a scanner probe with respect to an antenna under test.

FIG. 3 is a schematic diagram showing the movement of the scanner probe 50 with respect to the different columns of radiating elements 34, 36, 38 and 40 in the phased array antenna 20 under test.

Figure 4:
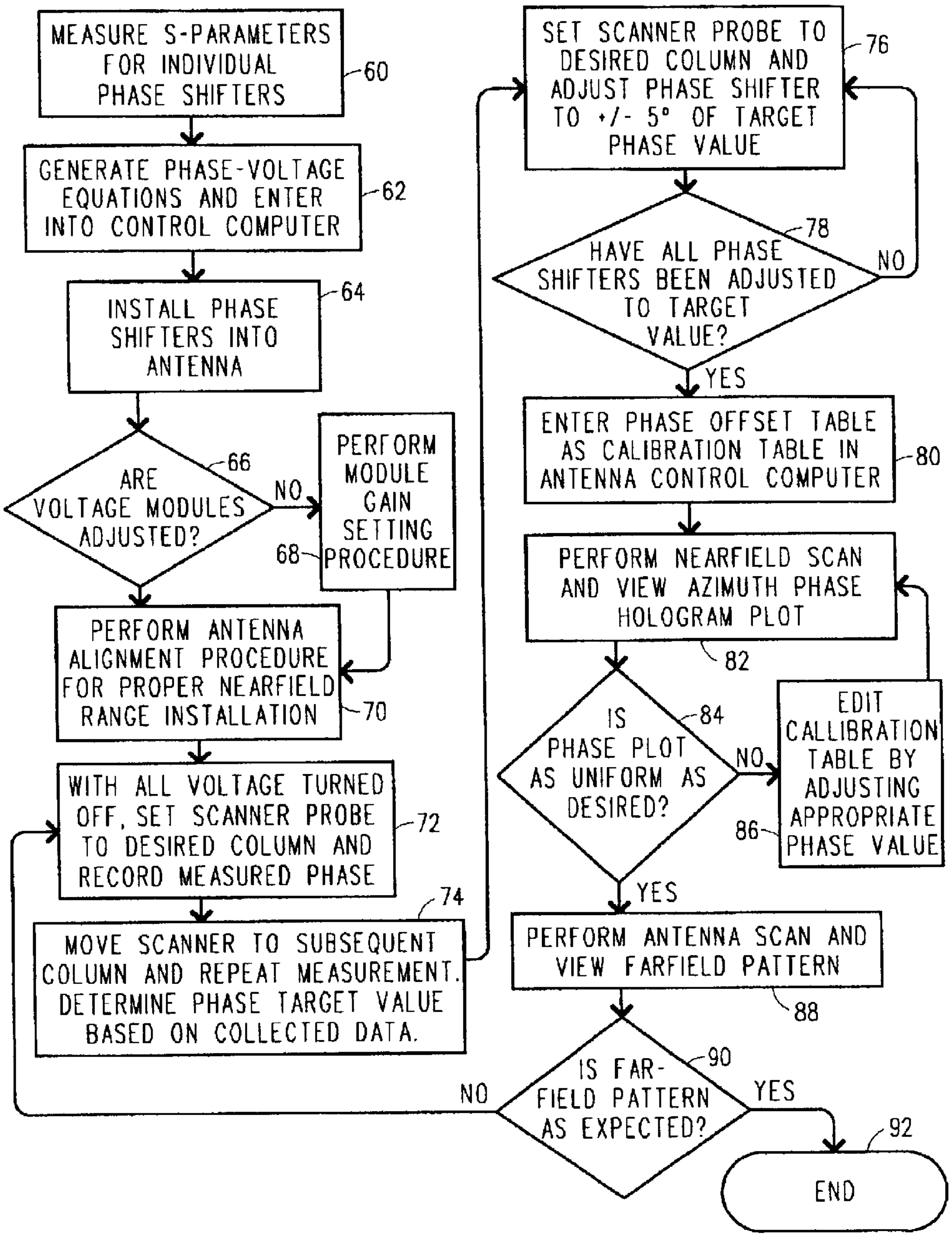
FIG. 4 is a flowchart illustrating the steps of the preferred calibration method of the present invention.

FIG. 4 is a flow chart of the steps used in a calibration procedure that includes the method of the invention. The S-parameters of individual phase shifters 30 are initially measured as shown in block 60. The S-parameter measurements are used to generate voltage equations that are entered into the control computer 26, as shown in block 62. Block 64 shows that all phase shifters 30 are then installed into the phased array antenna 20 to be tested. If the voltage modules are not adjusted as shown in block 66, block 68 shows that the module gain setting procedure is performed. If the voltage modules are adjusted, the phase array antenna 20 is aligned for installation in a nearfield test range as shown in block 70.

Block 72 shows that the tuning voltages for the phase shifters 30 are initially set to zero and the amplitude and phase of the signal detected by the scanner probe 50 is measured for a desired column of radiating elements 34, 36, 38 and 40. Block 74 shows that the scanner probe 50 is moved to a subsequent column of radiating elements 34, 36, 38 and 40 and the phase measurement is repeated. Then a phase target value is determined based on the collected data. Next the scanner probe 50 is positioned to receive signals from a desired column of radiating elements 34, 36, 38 and 40 and the phase of the associated phase shifter 30 is adjusted to within a predetermined phase shift range of, for example, ±5° of a target phase value, as shown in block 76. Block 78 shows that the phase shifters 30 for all columns of radiating elements 34, 36, 38 and 40 are adjusted to the target value range. Once this has been accomplished, the phase-offset table is entered as a calibration table in the control computer 26, as shown in block 80.

Next, the calibration table can be edited as follows. A nearfield scan is conducted and an azimuth phase hologram plot is produced as shown in block 82. If the azimuth phase hologram plot does not meet desired uniformity criteria, as shown in block 84, the phase shifter values in the calibration table are adjusted as shown in block 86. If the azimuth phase hologram plot meets the desired uniformity criteria, a farfield measurement is made to produce a farfield plot, as shown in block 88. If the farfield plot does not meet desired uniformity criteria, as shown in block 90, the process in block 72 is repeated. If the farfield plot meets the desired uniformity criteria, the calibration process is terminated as shown in block 92.

This invention provides a method for calibrating scanning phased array antennas 20 utilizing tunable phase shifters 30. The phase shifters 30 are cohered such that a uniform phase is applied across all radiating elements 42 in order to yield a desired boresight beam 22. The calibration method provides complete characterization of the phase shifters 30, individual phase offsets for each column of radiating elements 34, 36, 38 and 40 and final boresight beam coherence.

In the calibration procedure of FIG. 4, S-parameter measurements are made on the individual phase shifters 30 and phase-voltage equations are calculated. The phased array antenna 20 is assembled and mounted on a nearfield test range with the scanner probe 50 positioned to measure the nearfield phase of each column or radiating elements 34, 36, 38 and 40. An offset table is created through several iterations of this measurement as the phase shifters 30 are adjusted toward a target value. The table is then used in the antenna control algorithm and results are further tuned through the use of nearfield hologram measurements. A final antenna measurement is taken producing the desired farfield antenna pattern.

Again, this invention provides a method for calibrating scanning antennas 20 containing electronically tunable phase shifters 30 utilizing a nearfield antenna range. The calibration technique can include an initial process of phase shifter characterization. Each phase shifter 30 can undergo S-parameter measurements including S21 phase and amplitude data while varying the applied voltage at discrete steps across the entire tuning range. This is done prior to the installation of the phase shifters 30 in the phased array antenna 20.

The characteristics of the phase shifters 30 are used to generate phase-voltage equations that are implemented into the antenna control algorithm. In the preferred embodiment, the phase is plotted vs. the applied voltage and a best-fit line is applied. The line can be a polynomial of any order but results show a minimum third order polynomial yields the desired results of the calibration. The equation for each phase shifter 30 is calculated and entered into the antenna control computer 26.

The calibration method can be performed using a nearfield test range that has undergone an antenna mounting and alignment procedure that ensures proper nearfield amplitude and phase measurements can be made for each column of radiating elements 34, 36, 38 and 40. To accomplish this, the level of the phased array antenna 20 is verified in all three (X, Y and Z) axes and made orthogonal to the scanner probe 50 in both the azimuth and elevation directions. The scanner probe 50 is positioned close to an aperature of the phased array antenna 20, for example, at a distance of 0.25λ to 0.50λ, where λ is the wavelength of a signal to transmitted and/or received by the phase array antenna 20.

The calibration method includes a single column phase measurement step using the nearfield antenna range. The nearfield range receiver 52 (network analyzer) is preferably set for high signal-to-noise phase and amplitude measurements. The scanner probe 50 is preferably positioned directly above the center of the column of radiating elements 34, 36, 38 and 40 to be tested. The single column measurements can include a series of steps yielding an offset calibration table that can be used for the initial baseline phase settings before additional iterations are completed converging towards the final calibration table. This table is generated by applying zero voltage to every phase shifter 30 and then measuring the phase of each column of radiating elements 34, 36, 38 and 40. These phases are used as the initial phase offset table and entered into the control computer 26. The calibration method then adjusts each phase shifter offset value until an acceptable variance between all phase shifters 30 is met. Each column of radiating elements 34, 36, 38 and 40 is measured using the scanner probe 50 and the phase offsets are varied until the desired phase is measured.

The method can further include a microwave holography measurement in order to fine-tune the phase values so that a flat phase front is measured in a nearfield antenna measurement. A nearfield scan can be taken and the data can be back transformed to get phase values at the aperture of the phased array antenna 20. Phase shifters 30 can then be adjusted until the aperture phase is as uniform in value as desired.

The calibration method can be verified through a final antenna measurement. The nearfield range is used to take a scan and a farfield plot is calculated. A good calibration will yield a good antenna pattern with symmetric main beam and low sidelobes. Pattern discrepancies can be used as indications of an undesirable calibration.

In the above description, the features of the phased array antenna 20 apply whether it is used for transmitting or receiving. For a passive reciprocal antenna, it is well known that the properties are the same for both the receive or transmit modes. Therefore, no confusion should result from a description that is made in terms of one or the other mode of operation and it is well understood by those skilled in the art that the invention is not limited to one or the other mode.

While the present invention has been described in terms of its preferred embodiments, it will be apparent to those skilled in the art that various changes can be made to the disclosed embodiments without departing from the scope of the invention as set forth in the following claims.

What is claimed is:

1. A method for calibrating a phased array antenna containing a plurality of electronically tunable phase shifters each of which is coupled to a column of radiating elements, said method comprising the steps of:

measuring S-parameters for each of the phase shifters while varying the tuning voltage applied to each of the phase shifters in discrete steps across a tuning range:

generating phase-voltage equations for each of the phase shifters based on the measured S-parameters;

entering the phase-voltage equations into the controller:

calculating phase offsets for each column of radiating elements using a nearfield antenna range and the characterized data for each of the electronically tunable phase shifters; and using the calculated phase offsets in a calibration table to adjust the tuning voltage of each of the electronically tunable phase shifters to cause the columns of radiating elements to yield a uniform beam.

2. The method of claim 1, wherein said calculating step includes:

mounting said phased array antenna in the nearfield antenna range including a scanner probe positioned orthogonal to the phased array antenna in both azimuth and elevation directions.

3. The method of claim 2, wherein said scanner probe is positioned a distance in the range of 0.25λ, to 50λ, from an aperture of the phased array antenna, where λ is a wavelength of a signal to be processed by the antenna.

4. The method of claim 1, further comprising the steps of:

performing a nearfield scan;

producing azimuth phase hologram plot;

comparing the azimuth phase hologram plot with a desired azimuth phase hologram plot; and adjusting the calibration table if the azimuth phase hologram plot differs from the desired azimuth phase hologram plot.

5. The method of claim 4, further comprising the steps of:

performing farfield scan;

producing a farfield plot;

comparing the farfield plot with a desired farfield plot; and repeating said characterizing step and said calculating step if the farfield plot differs from the desired farfield plot.

6. A method for calibrating a phased array antenna containing a plurality of electronically tunable phase shifters each of which is coupled to a column of radiating elements and a controller for supplying a tuning voltage to the electronically tunable phase shifters, said method comprising the steps of:

applying zero voltage to each of the phase shifters and measuring the phase of each of the plurality of columns of radiating elements in the phased array antenna;

using the measured phase to determine a phase target value for each of the plurality of columns of radiating elements in the phased array antenna;

adjusting a phase shift for each column of radiating elements in the phased array antenna to a value within a predetermined range of the phase target value to generate phase offset data; and using the phase offset data to produce a calibration table for use in the controller to adjust the tuning voltage of each of the phase shifters to cause the columns of radiating elements to yield a uniform beam.

7. The method of claim 6, further comprising the steps of: measuring S-parameters for each of the phase shifters while varying a tuning voltage applied to each of the phase shifter in discrete steps across a tuning range;

generating phase-voltage equations for each of the phase shifters based on the measured S-parameters; and entering the phase-voltage equations into an antenna control algorithm.

8. The method of claim 7, wherein the step of generating phase-voltage equations for each of the phase shifters comprises the steps of:

plotting phase versus the applied tuning voltage; and determining a best-fit line.

9. The method of claim 8, wherein the best fit line is a third order polynomial.

10. The method of claim 6, further comprising the step of:

positioning a scanner probe orthogonal to the phased array antenna in both azimuth and elevation directions.

11. The method of claim 10, wherein said scanner probe is positioned a distance in the range of 0.25λ to 50λ, from an aperture of the phased array antenna, where λ is a wavelength of a signal to be processed by the phased array antenna.

12. The method of claim 10, wherein said scanner probe is positioned directly above the center of the column of radiating elements to be tested.

13. The method of claim 6, wherein said step of adjusting the phase shift for each column of radiating elements comprises the step of:

measuring the phase offset of each of the phase shifters and adjusting the phase offset until a desired phase is measured.

14. The method of claim 13, wherein said step of measuring the phase offset of each of the phase shifters comprises the step of:

making a microwave holography measurement to fine-tune the phase values so that a flat phase front is realized in a nearfield antenna measurement.

15. The method of claim 13, wherein said step of measuring the phase offset of each of the phase shifters comprises the step of:

back transforming nearfield scan data to obtain phase values at the aperture of the antenna.

16. The method of claim 6, further comprising the steps of:

making a farfield antenna measurement and calculating a farfield plot; and comparing the farfield plot to a desired farfield plot.

17. A phased array antenna containing a plurality of electronically tunable phase shifters each of which is coupled to a column of radiating elements and a controller for supplying a tuning voltage to the electronically tunable phase shifters, said phased array antenna is calibrated by a method including the steps of:

applying zero voltage to each of the phase shifters and measuring the phase of each of the plurality of columns of radiating elements in the phased array antenna;

using the measured phase to determine a phase target value for each of the plurality of columns of radiating elements in the phased array antenna;

adjusting a phase shift for each column of radiating elements in the phased array antenna to a value within a predetermined range of the phase target value to generate phase offset data; and using the phase offset data to produce a calibration table for use in the controller to adjust the tuning voltage of each of the phase shifters to cause the columns of radiating elements to yield a uniform beam.

18. The phased array antenna of claim 17, wherein said calibration method further comprises the steps of:

measuring S-parameters for each of the phase shifters while varying a tuning voltage applied to each of the phase shifter in discrete steps across a tuning range;

generating phase-voltage equations for each of the phase shifters based on the measured S-parameters; and entering the phase-voltage equations into an antenna control algorithm.

19. The phased array antenna of claim 18, wherein said step of generating phase-voltage equations for each of the phase shifters comprises the steps of:

plotting phase versus the applied tuning voltage; and determining a best-fit line.

20. The phased array antenna of claim 19, wherein said best fit line is a third order polynomial.

21. The method of claim 19, wherein said step of generating phase-voltage equations for each of the phase shifters comprises the steps of:

plotting phase versus the applied tuning voltage; and determining a best-fit line.

22. The phased array antenna of claim 17, wherein said calibration method further comprises the step of:

positioning a scanner probe orthogonal to the phased array antenna in both azimuth and elevation directions.

23. The phased array antenna of claim 22, wherein said scanner probe is positioned a distance in the range of 0.25λ, to 0.50λ from an aperture of the phased array antenna, where is a wavelength of a signal to be processed by the phased array antenna.

24. The phased array antenna of claim 22, wherein said scanner probe is positioned directly above the center of the column of radiating elements to be tested.

25. The phased array antenna of claim 17, wherein said step of adjusting the phase shift for each column of radiating elements comprises the step of:

measuring the phase offset of each of the phase shifters and adjusting the phase offset until a desired phase is measured.

26. The phased array antenna of claim 25, wherein said step of measuring the phase offset of each of the phase shifters comprises the step of:

making a microwave holography measurement to fine-tune the phase values so that a flat phase front is realized in a nearfield antenna measurement.

27. The phased array antenna of claim 25, wherein said step of measuring the phase offset of each of the phase shifters comprises the step of:

back transforming nearfield scan data to obtain phase values at the aperture of the antenna.

28. The phased array antenna of claim 17, further comprising the steps of:

making a final farfield antenna measurement and calculating a farfield plot; and comparing the farfield plot to a desired farfield plot.

* * * * *